United States Patent
Jeon et al.

(10) Patent No.: US 10,962,994 B2
(45) Date of Patent: Mar. 30, 2021

(54) PRESSURE CONTROL METHOD FOR HIGH-PRESSURE REGULATOR TO PREVENT INTERNAL LEAK, AND HIGH-PRESSURE SHUT-OFF VALVE

(71) Applicant: MOTONIC CORPORATION, Seoul (KR)

(72) Inventors: Wan Jae Jeon, Daegu (KR); Jun Hyeok Lee, Daegu (KR); Jae Kyung Kim, Daegu (KR); Yong Deok Park, Daegu (KR); Gu Ho Kim, Daegu (KR); Jae Kwang Kim, Daegu (KR); Yeong Dong Park, Daegu (KR); Yong Heon Kang, Daegu (KR)

(73) Assignee: MOTONIC CORPORATION, Seoul (KR)

( * ) Notice: Subject to any disclaimer, the term of this patent is extended or adjusted under 35 U.S.C. 154(b) by 63 days.

(21) Appl. No.: 16/369,907

(22) Filed: Mar. 29, 2019

(65) Prior Publication Data
US 2020/0159259 A1     May 21, 2020

(30) Foreign Application Priority Data

Nov. 15, 2018  (KR) .................. 10-2018-0141114
Jan. 23, 2019   (KR) .................. 10-2019-0008748

(51) Int. Cl.
*G05D 16/20*     (2006.01)
*F16K 1/30*      (2006.01)
*F16K 17/04*     (2006.01)

(52) U.S. Cl.
CPC ......... *G05D 16/2013* (2013.01); *F16K 1/305* (2013.01); *F16K 17/04* (2013.01)

(58) Field of Classification Search
CPC ................................. Y10T 137/0396
(Continued)

(56) References Cited

U.S. PATENT DOCUMENTS 6,363,959 B1 * 4/2002 Ollivier .............. G05D 16/0661
                                                      137/14
6,758,233 B2 * 7/2004 Sulatisky ............ F02D 41/0027
                                                      137/14
(Continued)

FOREIGN PATENT DOCUMENTS

JP    10-141516 A   5/1998
JP    3144914 B2    3/2001
(Continued)

OTHER PUBLICATIONS

Donghyuk Lee et al., "The Performance Experimental Evaluation for a CNG Regulator of Automotive Vehicle", Research, pp. 309-314.

*Primary Examiner* — Robert K Arundale
(74) *Attorney, Agent, or Firm* — Novick, Kim & Lee, PLLC; Jae Yoon Kim (57) ABSTRACT

Provided is a pressure control method for a high-pressure regulator to prevent internal leak, and the high-pressure shut-off valve so as to minimize an internal leak, due to high-pressure gas remaining in a high-pressure fuel line when a valve of a gas storage tank is shut off, caused by a pressure difference between a front end portion and a rear end portion of the high-pressure regulator introducing or discharging high-pressure gas. Accordingly, the convenience for connecting work is provided, the high safety is ensured, and the high-pressure regulator is used with the high reliability.

3 Claims, 7 Drawing Sheets

(58) Field of Classification Search
USPC .......................................................... 700/301
See application file for complete search history.

(56) References Cited

U.S. PATENT DOCUMENTS

| | | | |
|---|---|---|---|
| 9,234,485 B2* | 1/2016 | Ninomiya | F02M 21/0242 |
| 2005/0125105 A1* | 6/2005 | Halstead | G01K 1/028 |
| | | | 700/299 |
| 2007/0204915 A1 | 9/2007 | Kimbara et al. | |
| 2017/0292468 A1* | 10/2017 | Lee | F02D 41/3845 |
| 2018/0100596 A1* | 4/2018 | Lee | G05D 16/04 |

FOREIGN PATENT DOCUMENTS

| | | | |
|---|---|---|---|
| JP | 2002180907 A | 6/2002 | |
| JP | 3545273 B2 | 7/2004 | |
| KR | 1019980002710 A | 3/1998 | |
| KR | 200191862 Y1 | 8/2000 | |
| KR | 100898204 B1 | 5/2009 | |
| KR | 100938151 B1 | 1/2010 | |
| KR | 10-0941806 B1 | 2/2010 | |
| KR | 20110012263 A1 | 2/2011 | |
| KR | 101457125 B1 | 10/2014 | |
| KR | 101549480 B1 | 9/2015 | |
| KR | 1020180040010 A | 4/2018 | |
| KR | 101877293 B1 | 8/2018 | |
| WO | 2014-091691 A1 | 6/2014 | |

* cited by examiner

| Classification | Input value | | Converted value | | Calculation | | Creep pressure |
|---|---|---|---|---|---|---|---|
| | cc–cm³ | bar | m³ | kPa | p*v (Sum of front and rear) | v (Total volume) | bar |
| Front end | 1.3 | 700 | 0.0000013 | 70000 | 0.00443 | 0.0002213 | 20.02 |
| Rear end | 220 | 16 | 0.00022 | 1600 | | | |

| Classification | ① | ② | Creep pressure |
|---|---|---|---|
| Pressure | 700bar | 16bar | 95 bar estimated |
| Volume | 29cc | 220cc | (SPEC:Within 20.9) *Unsatisfied |

FIG. 7

PRESSURE CONTROL METHOD FOR HIGH-PRESSURE REGULATOR TO PREVENT INTERNAL LEAK, AND HIGH-PRESSURE SHUT-OFF VALVE

BACKGROUND OF THE INVENTION

1. Field of the Invention

The present invention relates to a high-pressure regulator, and more particularly, to a pressure control method for a high-pressure regulator to prevent internal leak, and the high-pressure shut-off valve so as to minimize an internal leak, due to high-pressure gas remaining in a high-pressure fuel line when a valve of a gas storage tank is shut off, caused by a pressure difference between a front end portion and a rear end portion of the high-pressure regulator introducing or discharging high-pressure gas, and facilitate a direct connection between an inlet port of the high-pressure regulator and the high-pressure fuel line.

2. Description of the Related Art

In general, a hydrogen fuel cell electric vehicle (FCEV) electrochemically generates electricity by using oxygen and hydrogen in a stack, directly converts chemical energy of fuel into electric energy, and uses the electric energy as a power source.

The hydrogen FCEV is an ideal technology having high efficiency and rarely discharging contaminants because electricity can be continuously generated by supplying fuel and air from the outside regardless of cell capacity, and thus lots of development efforts are in progress.

The hydrogen FCEV supplies hydrogen fuel from a fuel tank to the stack via a high-pressure regulator and a low-pressure regulator, and a hydrogen blower includes a pump and various valves that are connected to the low-pressure regulator.

In addition, the hydrogen FCEV further includes a rapid thawing water tank, a motor water pump, a thermostat, a stack cooling radiator, an air-conditioner condenser, an electric refrigerant compressor, a water tank, a humidifier, a driving motor, various controllers, an air blower and an air filter.

A fuel supply system of the hydrogen FCEV corresponds to an engine of a general gasoline or diesel vehicle, and is positioned at a frontal upper side of the vehicle.

In addition, a typical high-pressure regulator applied to the hydrogen FCEV handles high-pressure hydrogen of about 700 bar, and accordingly stable discharge pressure, sufficient pressure-resistance, and internal airtightness are very important.

An overpressure relief valve for relieving overpressure when the overpressure is generated due to malfunction and a fuel release valve for releasing fuel therein are applied to the above high-pressure regulator.

Herein, the front end portion of the high-pressure regulator is connected to a gas storage tank via a high-pressure fuel line, in which high-pressure fuel remains excessively in the high-pressure fuel line when the gas storage tank is shut off, and the high pressure is directly and excessively applied to a high-pressure sealing portion inside the high-pressure regulator.

Figure 7:
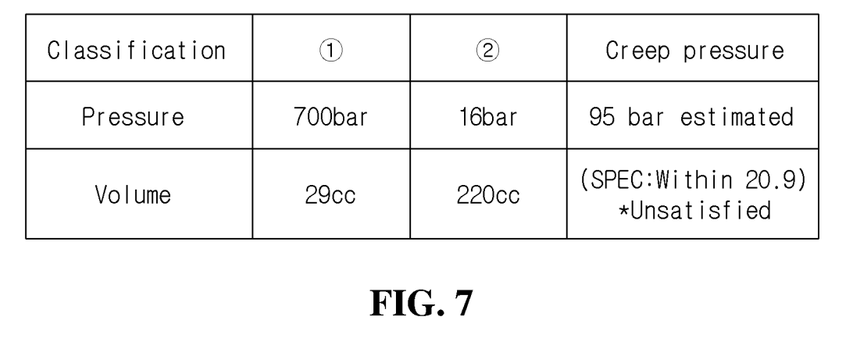
FIG. 7 is Table 2 showing the ratios of volume and pressure between a front end portion and a rear end portion of a general high-pressure regulator.

In other words, a pressure difference and a volume between the front end portion and the rear end portion of the conventional high-pressure regulator are measured as shown in Table 2 of FIG. 7.

That is, the pressure in the front end portion is about 700 bar and the volume is 29 cc=$cm^3$, and the pressure in the rear end portion is about 16 bar and the volume is 220 cc=$cm^3$, in which creep pressure is 95 bar.

Accordingly, pressure is generated toward an outlet port which is the rear end portion due to a micro leak in the high-pressure sealing portion, and the pressure increases, thereby causing gas to be leaked to the outside of the high-pressure regulator due to operation of the relief valve, and thus ignition of the vehicle is impossible, and the cause of a risky situation is provided.

Korean Patent Registration No. 10-0938151, Korean Patent Registration No. 10-1457125, Korean Patent Registration No. 10-1877293, and Korean Unexamined Patent Publication No. 10-2018-0040010 are disclosed as the conventional art related to the high-voltage regulator as described above (hereinafter referred to as "related art document 1").

However, related art document 1, as described above, still has problem causing a risky situation in that high-pressure fuel remains excessively in the high-pressure fuel line, when the gas storage tank is shut off and high pressure is directly and excessively applied to the high-pressure sealing portion inside the high-pressure regulator, so the micro leak occurs in the high-pressure sealing portion, and thus the pressure is generated toward the outlet port and the pressure increases, thereby causing gas to be leaked to the outside of the high-pressure regulator due to operation of the relief valve.

To solve the above problem, Korean Unexamined Patent Publication No. 10-1998-0002710, Korean Patent Registration No. 10-0898204, and Korean Patent Registration No. 10-1549480 are disclosed as the conventional art for regulating pressure of a regulator (hereinafter referred to as "related art document 2").

RELATED ART DOCUMENTS

Korean Patent Registration No. 10-0938151
Korean Patent Registration No. 10-1457125
Korean Patent Registration No. 10-1877293
Korean Unexamined Patent Publication No. 10-2018-0040010
Korean Unexamined Patent Publication No. 10-1998-0002710
Korean Patent Registration No. 10-0898204
Korean Patent Registration No. 10-1549480

SUMMARY OF THE INVENTION

However, related art document 2 is for removing the pressure of each line connected to the regulator, so the leakage, which is generated therein due to the pressure difference between the front end portion and the rear end portion of the regulator, cannot be prevented, in other words, the pressure inside the regulator cannot be regulated.

To solve the above conventional problem, the present invention provides a pressure control method for a high-pressure regulator to prevent internal leak, and the high-pressure shut-off valve so as to minimize an internal leak, due to high-pressure gas remaining in a high-pressure fuel line when a valve of a gas storage tank is shut off, caused by a pressure difference between a front end portion and a rear end portion of the high-pressure regulator introducing or discharging high-pressure gas, and facilitate a direct connection between an inlet port of the high-pressure regulator and the high-pressure fuel line.

To solve the above problems, the present invention further provides high airtightness maintained at the inlet port connected to the high-pressure regulator.

To solve the above technical problem, the present invention includes the steps of: measuring pressure of the front end portion and pressure of the rear end portion by two pressure sensors in a state where high pressure is maintained at the front end portion of the high-pressure regulator including the pressure sensors for measuring pressure and a control unit for controlling the pressure measured by the pressure sensors, and low pressure is maintained at the rear end portion of the high-pressure regulator; calculating, by the control unit, creep pressure by dividing a sum of a product of the pressure of the front end portion and a volume of the front end portion and a product of the pressure of the rear end portion and a volume of the rear end portion by a sum of the volume of the front end portion and the volume of the rear end portion; and regulating, by the control unit, the volume of the front end portion after comparing the creep pressure with a preset pressure of a relief valve, wherein, when the creep pressure is greater than the preset pressure of the relief valve in the step of regulating the volume of the front end portion, the control unit controls the ratio of the volume of the front end portion to the volume of the rear end portion to be small by limiting the volume of the front end portion.

The volume of the front end portion is regulated by a shut-off valve provided in an inlet port, which is the front end portion of the high-pressure regulator, and connected to the high-pressure fuel line of the gas storage tank.

The ratio of the volume of the front end portion to the volume of the rear end portion is 1:169.

The high-pressure shut-off valve, which is provided between the high-pressure fuel line connected to the gas storage tank and the high-pressure regulator, includes: a body housing provided at an outer side thereof with a connection terminal and including a bobbin provided in the body housing and wound with a coil; a coupling fixing member disposed at a front end of the body housing, in which the coupling fixing member has one end fixedly coupled to an inlet chamber of an inlet port of the high-pressure regulator and an opposite end fixedly inserted into the body housing, and the coupling fixing member includes a plunger configured to reciprocate inside the coupling fixing member and has an inflow passage for opening and closing an inlet in the inlet port; and a connection fixing member disposed at a rear end of the body housing in which the connection fixing member has one end inserted and fixed into the body housing and an opposite end protruding to an outside of the body housing and fixedly fastened to the high-pressure fuel line, and formed therein with a supply passage.

The high-pressure shut-off valve further includes a first airtight ring fixed to an outer side of a position of the coupling fixing member where the coupling fixing member abuts an entrance of the inlet port.

The plunger includes an opening/closing member formed at a front end of the plunger to open/close an inlet, and a plunger rod formed therein with an inflow passage and fixedly coupled to the opening/closing port to reciprocate, in which a spring is interposed between the plunger rod and the connection fixing member.

The opening/closing member has a conical shape corresponding to the inlet, in which a second airtight ring for airtightness is fixedly coupled to an outer surface of the opening/closing member.

The inflow passage includes a passage corresponding to the supply passage while one side of the spring is inserted into the passage, and a plurality of inflow holes formed toward the inlet chamber and connected to the passage so as to be connected to the inlet chamber.

According to the present invention, the internal leak, due to high-pressure gas remaining in a high-pressure fuel line when a valve of a gas storage tank is shut off, and caused by a pressure difference between a front end portion and a rear end portion of the high-pressure regulator introducing or discharging high-pressure gas is minimized, thereby enabling the vehicle to be smoothly restarted and preventing the risky condition due to the leak of the high-pressure gas, so that the high-pressure regulator can be used with high reliability and used safely and stably.

In addition, the convenience for connecting the inlet port of the high-pressure regulator to the high-pressure fuel line can be provided, and the high safety can be ensured.

In addition, the high airtightness is maintained at the inlet port connected to the high-pressure regulator, so that the higher safety can be ensured when the high-pressure fuel is supplied.

DETAILED DESCRIPTION OF THE INVENTION

Hereinafter, preferred embodiments of the present invention will be described in detail with reference to the accompanying drawings, and the present invention is not limited to or restricted by the embodiments.

Figure 1:
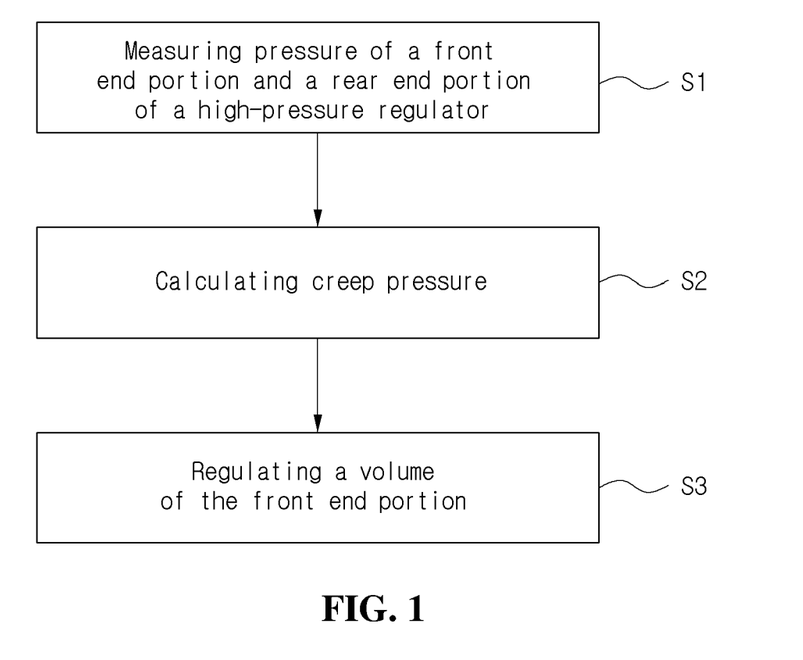
FIG. 1 is a block diagram for illustrating a pressure control method according to the present invention.
Figure 2:
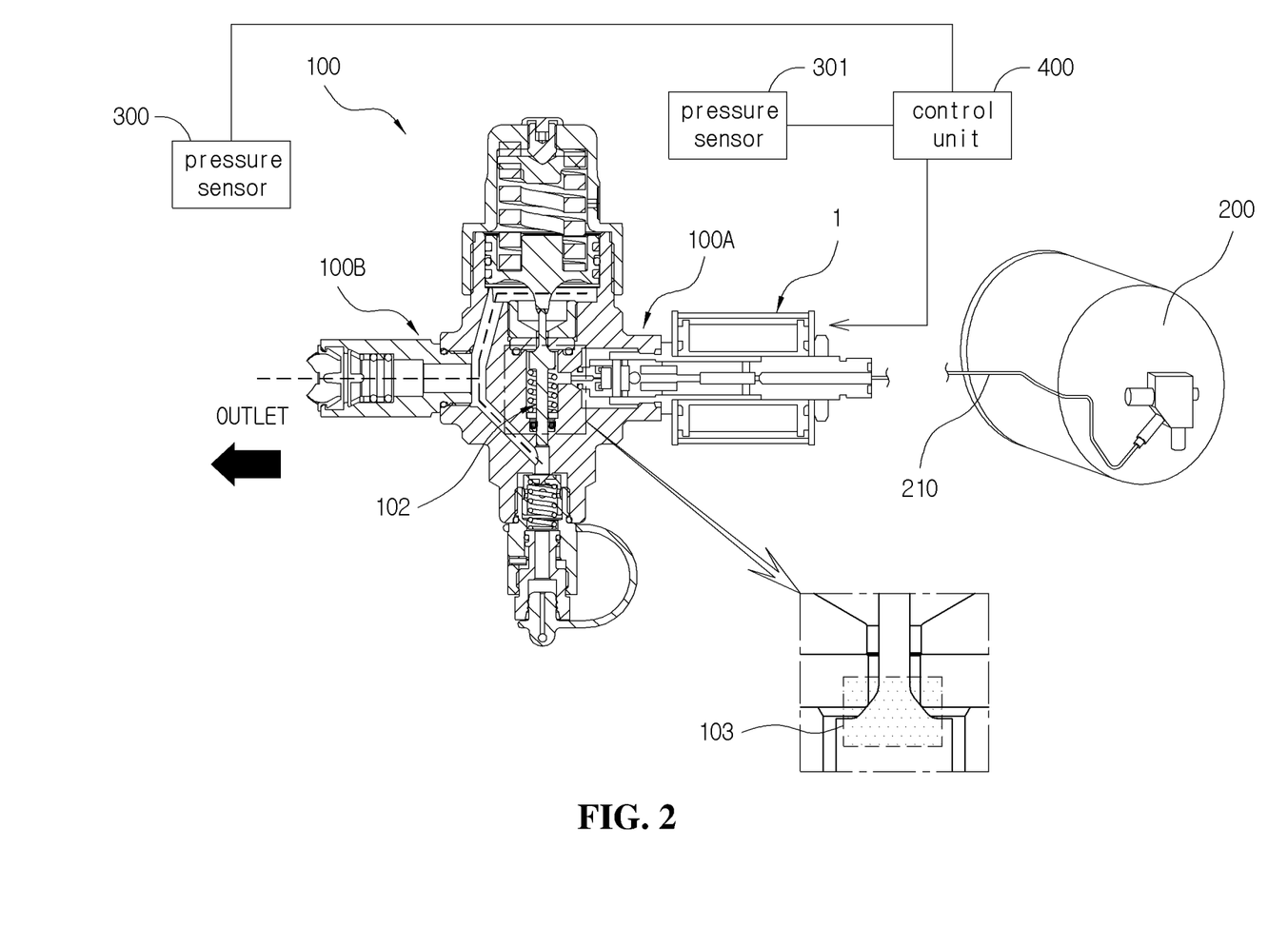
FIG. 2 is a conceptual diagram for illustrating a state where the present invention is applied to a high-voltage regulator.

FIG. 1 is a block diagram for illustrating a pressure control method according to the present invention. FIG. 2 is a conceptual diagram for illustrating a state where the present invention is applied to a high-voltage regulator.

As shown in the drawings, in general, a typical high-pressure regulator 100 applied to a hydrogen FCEV handles high-pressure hydrogen of about 700 bar, and accordingly stable discharge pressure, sufficient pressure-resistance, and internal airtightness are very important.

In other words, a pressure difference and a volume between a front end portion 110 and a rear end portion 120 of the conventional high-pressure regulator 100 are measured as shown in Table 2 of FIG. 7.

An overpressure relief valve for relieving overpressure when the overpressure is generated due to malfunction and a fuel release valve for releasing fuel therein are applied to the above high-pressure regulator.

Figure 3:
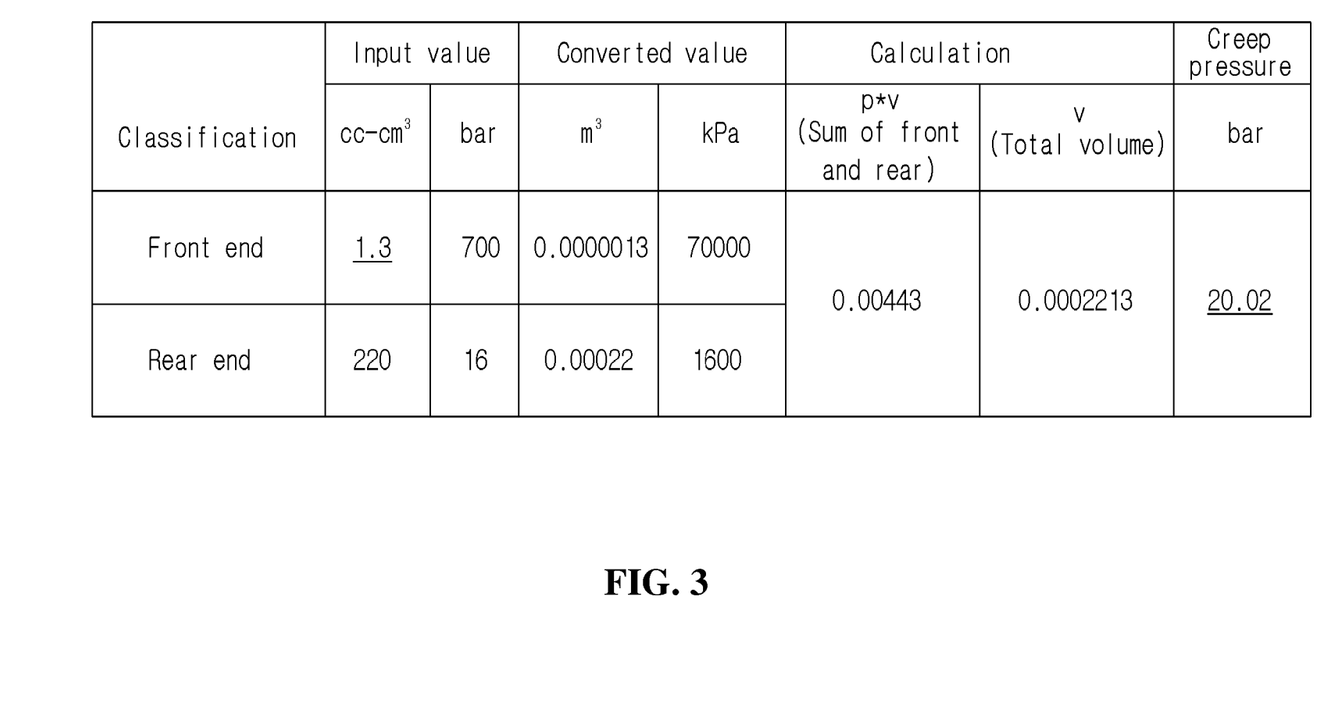
FIG. 3 is Table 1 showing the ratios of volume and pressure between a front end portion and a rear end portion of a high-pressure regulator according to the present invention.

Herein, the front end portion of the high-pressure regulator is connected to a gas storage tank via a high-pressure fuel line, in which high-pressure fuel remains excessively in the high-pressure fuel line when the gas storage tank is shut off, and the high pressure is directly and excessively applied to a high-pressure sealing portion of the high-pressure regulator (see FIG. 3).

Accordingly, pressure is generated toward an outlet port which is the rear end portion due to a micro leak in the high-pressure sealing portion, and the pressure increases, thereby causing gas to be leaked to the outside of the high-pressure regulator due to operation of the relief valve, and thus ignition of the vehicle is impossible, and the cause of a risky situation is provided.

The present invention is provided to minimize an internal leak, due to high-pressure gas remaining in the high-pressure fuel line when a valve of the gas storage tank is shut off, caused by a pressure difference between a front end portion and a rear end portion of the high-pressure regulator introducing or discharging the high-pressure gas.

The pressure control method to minimize the internal leak caused by the pressure difference between the front end portion and the rear end portion of the high-pressure regulator according to the present invention will be described as follows.

First, the method includes the step of measuring pressure of a front end portion and a rear end portion by two pressure sensors 300, 301, in a state where high pressure is maintained at a front end portion 100A of the high-pressure regulator 100, which includes the conventional pressure sensors for measuring pressure and a conventional control unit (400) for controlling the pressure measured by the pressure sensors, due to the connection to a high-pressure fuel line 210 connected to a gas storage tank 200, and low pressure is maintained at a rear end portion 100B of the high-pressure regulator 100 (S1).

In other words, because the inlet port, which is the front end portion of the high-pressure regulator, is connected to the high-pressure fuel line connected to the gas storage tank, the front end portion is in a high pressure state of about 700 bar, and the volume is about 29 cc=cm$^3$. Whereas, the outlet port, which is the rear end of the high-pressure regulator, is in a low pressure state of about 16 bar, and the volume is maintained at about 220 cc=cm$^3$.

Then, the control unit performs the step of calculating creep pressure by dividing a sum of a product of the pressure of the front end portion and a volume of the front end portion and a product of the pressure of the rear end portion and a volume of the rear end portion by a sum of the volume of the front end portion and the volume of the rear end portion (S2; see FIG. 3).

In other words, the creep pressure (20.02 bar) is calculated by dividing the sum (0.00443) of a product of the pressure (700 bar) of the front end portion and the volume (1.3 cc=cm$^3$) of the front end portion and a product of the pressure (16 bar) of the rear end portion and the volume (220 cc=cm$^3$) of the rear end portion by the sum (0.0002213 cc=cm$^3$) of the volume of the front end portion and the volume of the rear end portion.

Further, the method includes the step of regulating, by the control unit, the volume of the front end portion after comparing the creep pressure with a preset pressure of a relief valve (S3), wherein, when the creep pressure is greater than the preset pressure of the relief valve in step S3 of regulating the volume of the front end portion, the control unit controls the ratio of the volume of the front end portion to the volume of the rear end portion to be small by limiting the volume of the front end portion.

Herein, the volume of the front end portion is regulated by a shut-off valve 1 provided in an inlet port, which is the front end portion 100A of the high-pressure regulator 100, and connected to the high-pressure fuel line 210 of the gas storage tank 200.

In the above case, the high-pressure shut-off valve 1 may have any known structure that prevents the high pressure remaining in the high-pressure fuel line 210 from flowing into the high-pressure regulator 100.

Accordingly, as shown in Table 1 of FIG. 3, the creep pressure generated in the rear end portion 100B is about 20.02 bar, in which an increase of the creep pressure in the rear end portion becomes smaller than the pressure of the relief valve 102 even when the internal leak occurs in the high-pressure sealing portion 103, so that leak to the outside is prevented.

In the above case, the ratio of the volume of the front end portion to the volume of the rear end portion is 1:169.

Accordingly, the internal leak caused by the pressure difference between the front end portion and the rear end portion of the high-pressure regulator is minimized, thereby enabling the vehicle to be smoothly restarted, and preventing a risky situation due to the leak of the high-pressure gas.

Thus, the present invention has a simple technical configuration other than a complicated technical configuration, thereby minimizing the internal leak caused by the pressure difference between the front end portion and the rear end portion of the high-pressure regulator, so that the high-pressure regulator can be used with high reliability, and can be used safely and stably.

Figure 4:
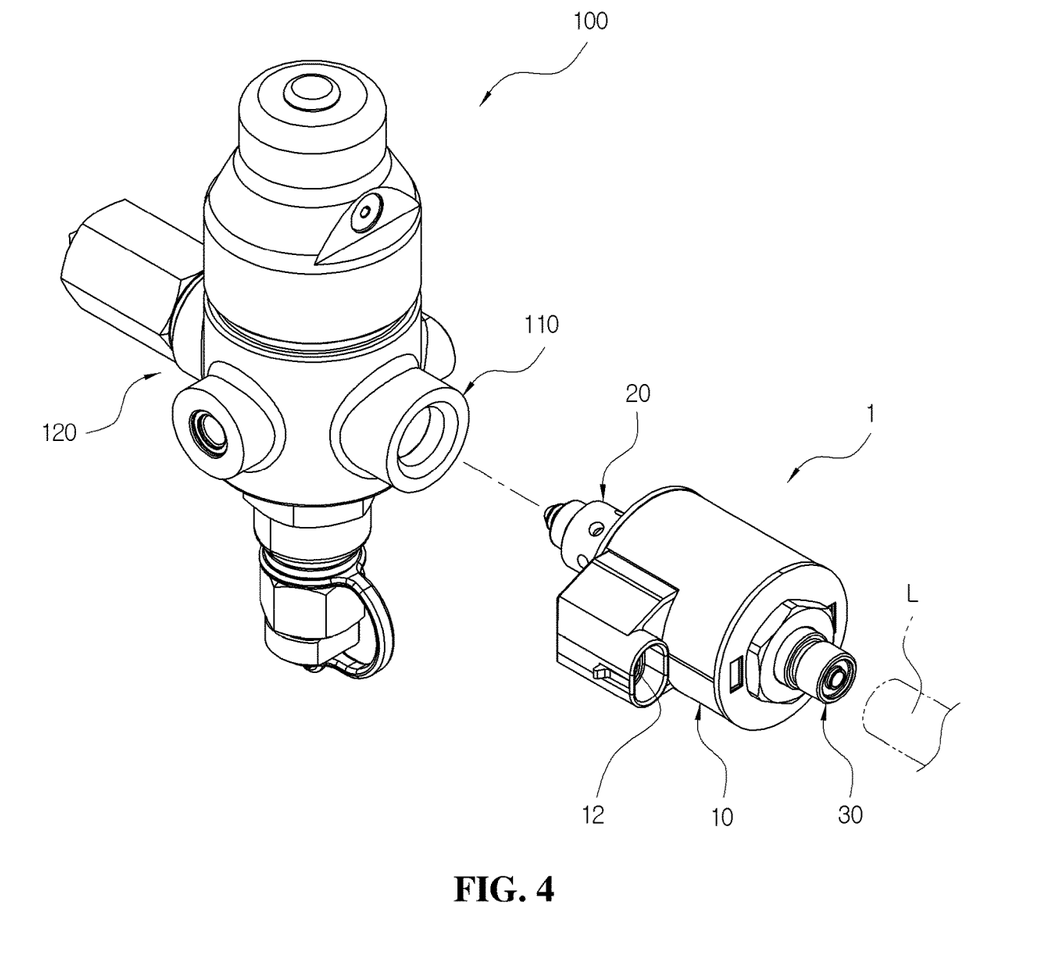
FIG. 4 is an exploded perspective view for illustrating a high-pressure shut-off valve according to the present invention.
Figure 5:
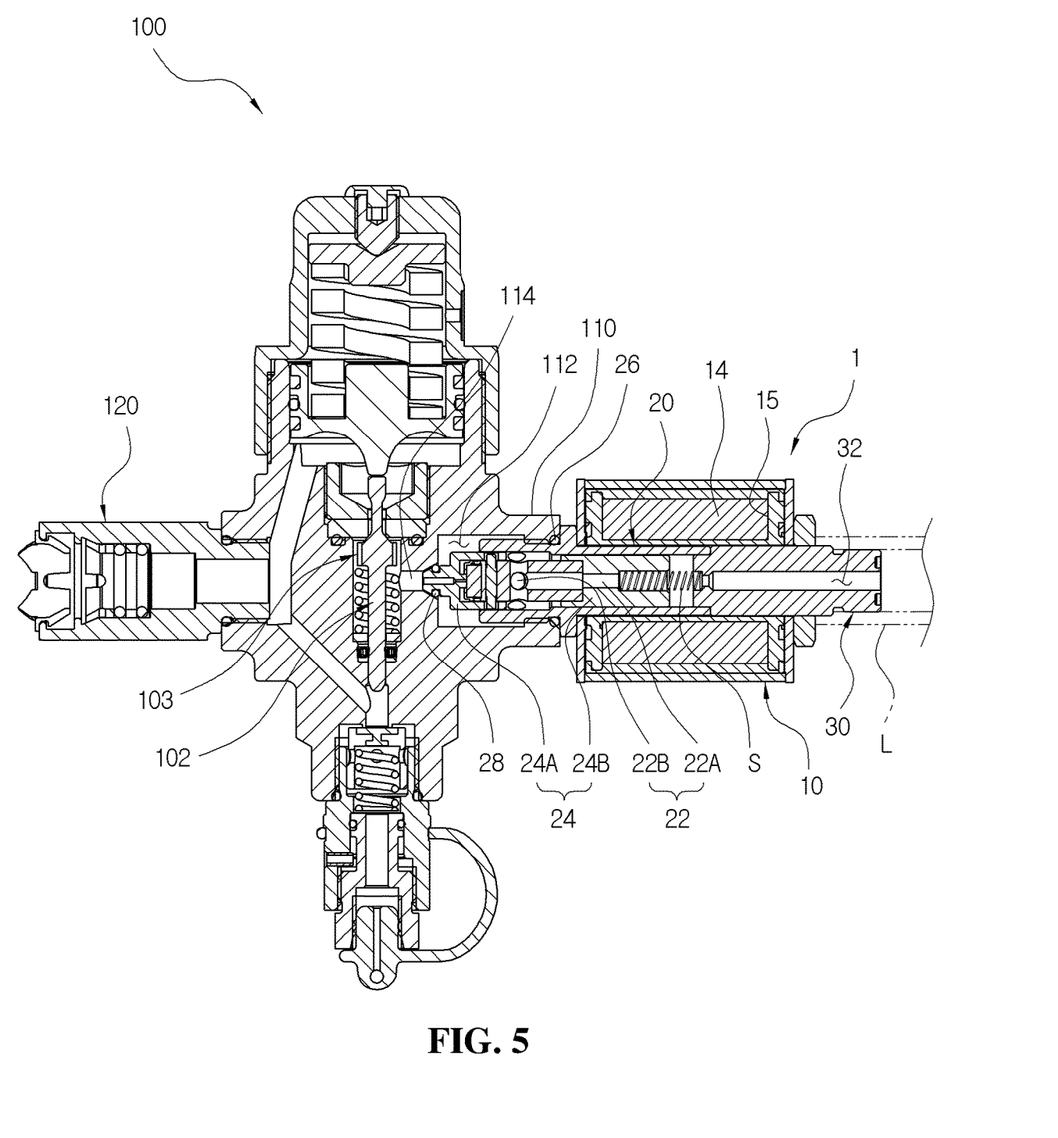
FIG. 5 is an engaging sectional view according to FIG. 4.
Figure 6A:
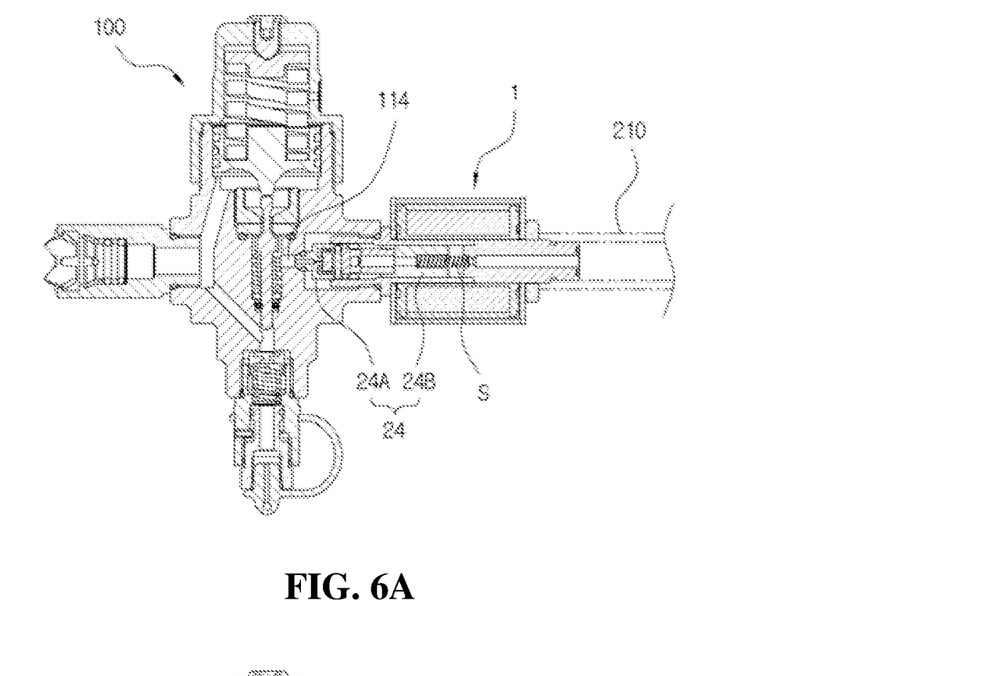
FIGS. 6A-6B are sectional views for illustrating a state of using a high-pressure shut-off valve of the present invention.
Figure 6B:
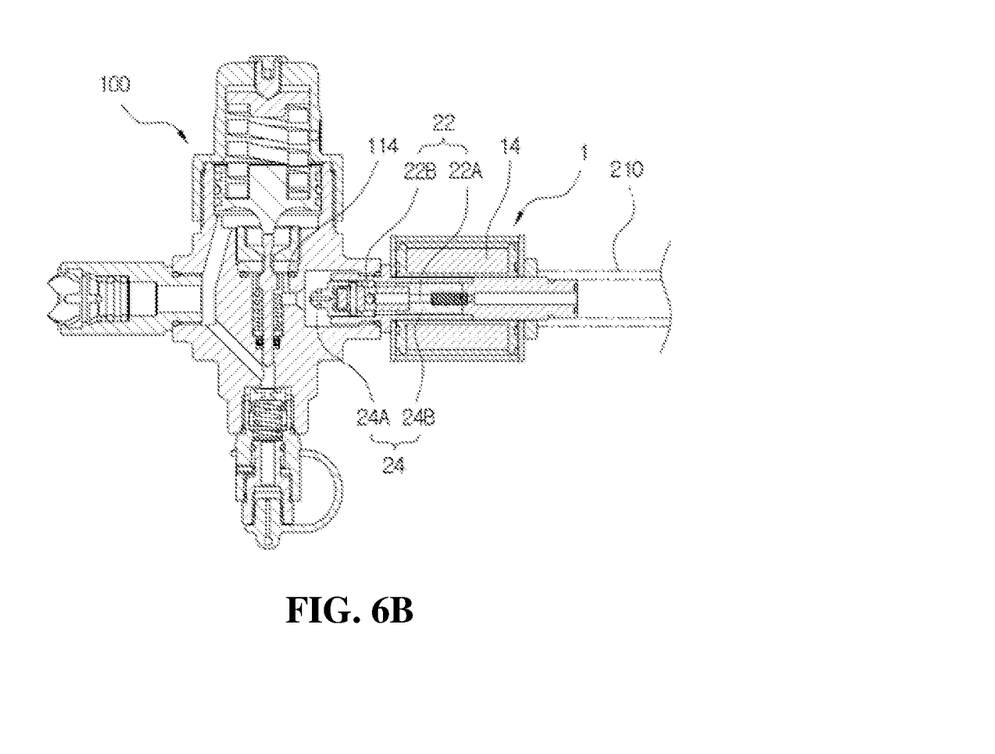

FIG. 4 is an exploded perspective view for illustrating the high-pressure shut-off valve according to the present invention. FIG. 5 is an engaging sectional view according to FIG. 4. FIGS. 6A and 6B are sectional view for illustrating a state of using the high-pressure shut-off valve of the present invention.

As shown in the drawings, a typical high-pressure regulator applied to the hydrogen FCEV handles high-pressure hydrogen of about 700 bar, and accordingly stable discharge pressure, sufficient pressure-resistance, and internal airtightness are very important.

Accordingly, the pressure is generated toward an outlet port 120 that is the rear end portion due to the micro leak of the high-pressure sealing portion 103 and the pressure increases, thereby causing gas to be leaked out of the high-pressure regulator 100 due to operation of the relief valve 102, and thus the cause of a risky situation is provided.

Herein, since the high-pressure regulator 100 has a known technical configuration and corresponds to the technical configuration disclosed in related art document 2, which is selected and registered or published by the applicant of the present invention and described in the background of the invention, the detailed description of the technical configuration of the high-pressure regulator will be omitted.

In addition, an embodiment of the present invention describes the high-pressure shut-off valve for the high-pressure regulator applied to the hydrogen FCEV, but the present invention is not limited thereto, and the present invention may also be applied to a high-pressure regulator that supplies various types of high-pressure gaseous fuels such as LPG or compressed natural gas (CNG) toward an engine by reducing pressure of the high-pressure gaseous fuel.

Referring to FIG. 2 according to the present invention, the high-pressure shut-off valve 1 provided between the high-pressure regulator 100 and the high-pressure fuel line 210 connected to the gas storage tank 200 mainly includes a body housing 10, a coupling fixing member 20, and a connection fixing member 30.

The body housing 10 is configured to be provided a conventional connection terminal 12 for supplying electricity to one external side, and include a bobbin 15 provided in the body housing and wound with a coil 14 for generating an induced current by a known scheme.

The coil is connected to the connection terminal by a known scheme.

Each end of the coupling fixing member and the connection fixing member is configured to be inserted into a center of the bobbin.

In other words, the body housing has a shape of a conventional case accommodated therein with a bobbin wound with a coil, and may have a polygonal shape as well as a cylindrical shape as shown in the drawing.

The coupling fixing member 20 is configured to be connected to the high-pressure regulator 100 and the body housing 10.

In other words, the coupling fixing member 20 is disposed at a front end of the body housing 10, has one end fixedly coupled to the inlet chamber 112 of the inlet port 110, which is a front end portion of the high-pressure regulator 100, by the conventional forcedly-fitted or screwed scheme, and the other end fixedly inserted to the body housing 10 by the conventional forcedly-fitted or screwed scheme, and includes a plunger 24 provided to reciprocate in the coupling fixing member 20 and having an inflow passage 22 for opening and closing the inlet 114 in the inlet port 110. The plunger is configured to reciprocate in the coupling fixing member by a conventional scheme, in which the plunger retracts from the inlet of the inlet port to open the inlet when electricity is applied to the coil of the body housing. Whereas, when the electricity to the coil is short-circuited, the plunger closes the inlet of the inlet port while being advanced by the spring interposed between the coupling fixing member and the connection fixing member which is described later.

In other words, the coupling fixing member serves as an important component for opening and closing the inlet of the inlet port to supply and block the high-pressure gas.

In addition, the coupling fixing member further includes a first airtight ring 26 fixed to an outer side of a position of the coupling fixing member 20 where the coupling fixing member 20 abuts an entrance of the inlet port 110.

In other words, in a state where a front end of the coupling fixing member is fixed, the high-pressure gas in the inlet chamber of the inlet port is prevented from being leaked to the outside.

In addition, the plunger 24 includes an opening/closing member 24A formed at a front end thereof to open/close the inlet 114, and a plunger rod 24B formed therein with an inflow passage 22 and fixedly coupled to the opening/closing member 24A by a conventional pin-coupling scheme or the like, in which a spring S for closing the inlet 114 is interposed between the plunger rod 24B and the connection fixing member 30.

In other words, the plunger opens the inlet by the coil provided in the body housing and closes the inlet by the spring.

Particularly, the plunger has a technical configuration to supply the high-pressure gas through the inflow passage formed therein.

In addition, the opening/closing member 24A has a conical shape corresponding to the inlet 114, and further includes a second airtight ring 28 fixedly coupled to an outer surface of the opening/closing member 24A for airtightness.

In other words, when the inlet is closed by the opening/closing member, the second airtight ring prevents the high-pressure gas already supplied to the high-pressure regulator from flowing back through the inlet, or prevents the high-pressure gas remaining in the inlet chamber from being leaked toward the high-pressure regulator, so that the high airtightness can be maintained.

In addition, the inlet passage 22 includes a passage 22A corresponding to a supply passage of the connection fixing member described later while one side of the spring S is inserted into the passage 22A, and a plurality of inflow holes 22B directed to the inlet chamber 112 and connected to the passage 22A so as to be connected to the inlet chamber 112.

In other words, the high-pressure gas is smoothly supplied into the inlet chamber through the inflow holes via the passage of the inflow passage, and simultaneously the pressure is lowered, so that the safety is ensured.

The connection fixing member 30 is configured to be connected to the body housing 10 and the high-pressure fuel line 210.

In other words, the connection fixing member 30 is disposed at a rear end of the body housing 10, has one end fixedly inserted to an inside of the body housing 10 by the conventional forcedly-fitted or screwed scheme and the other end protruding to the outside of the body housing 10 and fixedly fastened to the high-pressure fuel line 210 by the conventional scheme, and has a supply passage 32 therein.

Accordingly, it is convenient to easily and conveniently connect and use the connection supply line without using any additional component, connector or the like.

Therefore, according to the present invention, a direct connection between the inlet port of the high-pressure regulator and the high-pressure fuel line is facilitated, so that the convenience of use can be further improved.

In addition, minimum high-pressure fuel remains in the high-pressure fuel line 210 when the gas storage tank 200 is shut off, the micro leak of the high-pressure sealing portion 103 in the high-pressure regulator 100 is prevented to minimize the increase of the pressure in the outlet port 120 as the rear end portion, and the leak due to the operation of the relief valve 102 is prevented, so that the high safety upon use of the high-pressure regulator can be ensured.

What is claimed is:

1. A pressure control method for a pressure regulator to prevent internal leak, the pressure regulator including a plurality of pressure sensors for measuring pressures and a controller for controlling the pressures measured by the plurality of pressure sensors, the pressure control method comprising:

measuring pressures of a front end portion and a rear end portion of the pressure regulator by the plurality of pressure sensors in a state in which a first pressure is maintained at the front end portion of the pressure regulator, and a second pressure is maintained at the rear end portion of the pressure regulator, the second pressure being lower than the first pressure;

calculating creep pressure by the controller by dividing a sum of a product of the first pressure of the front end portion and a pre-measured volume of the front end portion and a product of the second pressure of the rear end portion and a pre-measured volume of the rear end portion by a sum of the pre-measured volume of the front end portion and the pre-measured volume of the rear end portion; and regulating a volume of the front end portion by the controller after comparing the creep pressure with a preset pressure of a relief valve of the pressure regulator, wherein the regulating of the volume of the front end portion includes controlling a ratio of the volume of the front end portion to a volume of the rear end portion to be decreased by limiting the volume of the front end portion, when the creep pressure is greater than the preset pressure of the relief valve.

2. The pressure control method of claim 1, wherein the volume of the front end portion is regulated by a shut-off valve provided in an inlet port, which is at the front end portion of the pressure regulator, and connected to a fuel line of a gas storage tank.

3. The pressure control method of claim 1, wherein the ratio of the volume of the front end portion to the volume of the rear end portion is regulated to be 1:169.

\* \* \* \* \*